Patented Oct. 28, 1952

2,615,915

UNITED STATES PATENT OFFICE 2,615,915

HALOGENOALKANENITRILES

Elbert C. Ladd, Passaic, N. J., assignor to United States Rubber Company, New York, N. Y., a corporation of New Jersey No Drawing. Application September 25, 1948, Serial No. 51,311

2 Claims. (Cl. 260—465.7)

The invention relates to a method of synthesizing certain alpha- and/or omega-halogenoalkanenitriles, and is based on the discovery that, in the presence of a source of free radicals, a 2-halogenoalkanenitrile, $XR_2C-CN$, will react with one or more molecules of an olefinic compound, $R'HC=CR''R'''$, or mixtures thereof, in the following manner:

(1)

$XR_2C-CN + nR'R''C=CHR'''$ $\xrightarrow{\text{free-radicals}}$

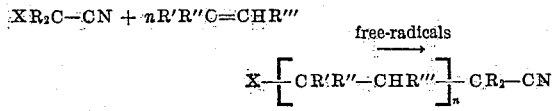

$n$ being a small integer, e. g., 1–5, and preferably 1–3.

In the above type formulae, the substituents R and X are radicals selected from the class of hydrogen, chlorine and bromine, and R may additionally be a hydrocarbon or substituted hydrocarbon group as hereinafter defined. In this respect, I have further discovered that while X may be bromine when R is any of the above-mentioned radicals, X may also be chlorine when the R substituents are chlorine, hydrocarbon or substituted hydrocarbon groups, and X may likewise be hydrogen when at least one of the R substituents is chlorine and the other is hydrogen, chlorine, hydrocarbon or substituted hydrocarbon.

The hydrocarbon and substituted hydrocarbon groups represented by R are selected from the class of alkyl (e. g., methyl, ethyl, propyl, isopropyl, butyl, sec.-butyl, amyl, cyclopentyl, hexyl, cyclohexyl, heptyl, octyl, nonyl, decyl, undecyl, dodecyl, tridecyl, tetradecyl, pentadecyl, hexadecyl), alkenyl (e. g., vinyl, 2-propenyl), aryl (e. g., phenyl, tolyl, xylyl, naphthyl, xenyl, p-chlorophenyl, o,p-dichlorophenyl, p-methoxyphenyl, p-carboxyphenyl, p-cyanophenyl), aralkyl (e. g., benzyl, phenethyl), haloalkyl (e. g., chloromethyl), hydroxyalkyl (e. g., methylol, beta-hydroxyethyl), carboxyl, groups hydrolyzable to carboxyl (including carbalkoxy, carbaryloxy, carbonitrilo and carbamyl, as well as the corresponding carboxyalkyl and carboxyalkenyl groups, such as carboxymethyl, carboxypropyl, carbonitrilomethyl, and carbomethoxypropenyl), acyl and acylalkyl (e. g., acetyl, oxalyl, propionyl, benzoyl, p-chlorobenzoyl, and acetylmethyl), acyloxy and acyloxyalkyl (e. g., acetoxy, propionoxy, butyroxy, benzoyloxy, acetoxymethyl, 2-acetoxyethyl, 2-acetoxypropyl, 3-acetoxypropyl), alkoxy and alkoxyalkyl (e. g., methoxy, ethoxy, ethoxyethoxy, ethoxymethyl and ethoxy-ethyl), aryloxy (e. g., phenoxy, o,p-dichlorophenoxy), aralkoxy (e. g., benzyloxy), as well as a 5 or 6-membered heterocyclic group, such as furyl, tetrahydrofuryl, thienyl, pyrryl, pyridyl and piperidyl; R' is selected from radicals represented above by R; R'' and R''' may be hydrogen, methyl, phenyl, methylol, chloromethyl, carboxyl, carboxyalkyl, a group hydrolyzable to carboxyl, as exemplified above, acyloxymethyl, alkoxymethyl, or aryloxymethyl, at least one of R', R'', and R''' being preferably hydrogen and R' being hydrogen when R'' and R''' are hydrogen.

The preparation of several preferred classes of compounds by the method of this invention are illustrated below:

(2)

$RCHBrCN + nR'R''C=CH_2 \longrightarrow$

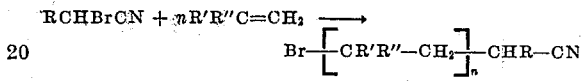

R being a hydrocarbon or substituted hydrocarbon group as defined above (3)

$RCBr_2CN + nR'R''C=CH_2 \longrightarrow$

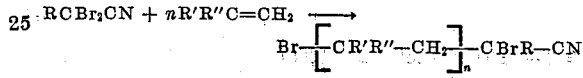

(4)

$BrR_2C-CN + nR'R''C=CH_2 \longrightarrow$

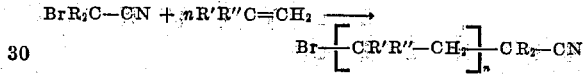

at least one R being chlorine, bromine, hydrocarbon or substituted hydrocarbon group (5)

$Br(Alkyl)CHCN + nR'R''C=CH_2 \longrightarrow$

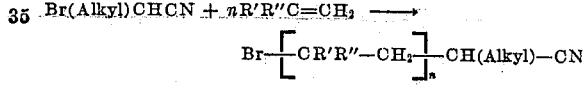

(6)

$Br(Aryl)CHCN + nR'R''C=CH_2 \longrightarrow$

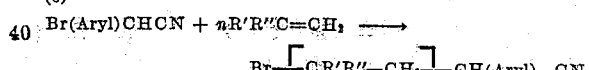

(7)

$BrCH_2-CN + nR'HC=CH_2 \longrightarrow$

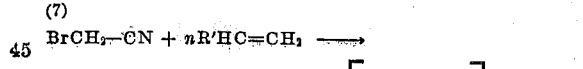

R' being alkyl, carboxyl, carboxyalkyl and groups hydrolyzable thereto, aryl or acyloxymethyl, as defined above (8)

$Cl_2RC-CN + nR'R''C=CH_2 \longrightarrow$

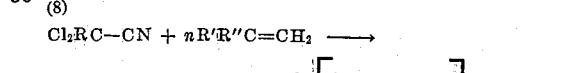

R being hydrocarbon or substituted hydrocarbon

TABLE I

| | 2-Halogenoalkanenitrile $R_2CX-CN$ | Olefinic Compound $R'R''C=CHR'''$ | Reaction Product $X-\left[CR'R''-CHR'''-CR_2-CN\right]_n$ | Reaction Product (n=1) $X-CR'R''-CHR'''-CR_2-CN$ |
|---|---|---|---|---|
| 1 | $Cl_3C-CN$ | $CH_2=CH_2$ | $Cl-[CH_2-CH_2-CCl_2-CN]_n$ | $Cl-CH_2-CH_2-CCl_2-CN$ |
| 2 | $Cl_3C-CN$ | $CH_3-CH=CH_2$ | $Cl-[CH(CH_3)-CH_2-CCl_2-CN]_n$ | $Cl-CH(CH_3)-CH_2-CCl_2-CN$ |
| 3 | $Cl_3C-CN$ | $(CH_3)_2C=CH_2$ | $Cl-[C(CH_3)_2-CH_2-CCl_2-CN]_n$ | $Cl-C(CH_3)_2-CH_2-CCl_2-CN$ |
| 4 | $ClCH_2CN$ | $(CH_3)_2C=CH_2$ | $H-[C(CH_3)_2-CH_2-CHCl-CN]_n$ | $CH(CH_3)_2-CH_2-CHCl-CN$ |
| 5 | $BrCH_2-CN$ | $CH_2=CH_2$ | $Br-[CH_2-CH_2-CH_2-CN]_n$ | $Br-CH_2-CH_2-CH_2-CN$ |
| 6 | $BrCH_2CN$ | $CH_3-CH=CH-CH_3$ | $Br-[CH(CH_3)-CH(CH_3)-CH_2-CN]_n$ | $CH_3-CHBr-CH(CH_3)-CH_2-CN$ |
| 7 | $CH_3-CHBr-CN$ | $C_6H_{13}-CH=CH_2$ | $Br-[CH(C_6H_{13})-CH_2-CH(CH_3)-CN]_n$ | $C_6H_{13}-CHBr-CH_2-CH(CH_3)-CN$ |
| 8 | $CH_3-CHBr-CN$ | $C_6H_5-CH=CH_2$ | $Br-[CH(C_6H_5)-CH_2-CH(CH_3)-CN]_n$ | $C_6H_5-CHBr-CH_2-CH(CH_3)-CN$ |
| 9 | $BrCH(CN)_2$ | $Cl-C_6H_4-CH=CH_2$ | $Br-[CH(C_6H_4Cl)-CH_2-CH(CN)_2]_n$ | $Cl-C_6H_4-CHBr-CH_2-CH(CN)_2$ |
| 10 | $BrCH_2CN$ | $CH_3-C_6H_4-C(CH_3)=CH_2$ | $Br-[C(CH_3)(C_6H_4-CH_3)-CH_2-CH_2-CN]_n$ | $CH_3-C_6H_4-CBr(CH_3)-CH_2-CH_2-CN$ |
| 11 | $C_6H_5-CHBr-CN$ | $(C_6H_3Cl_2)CH=CH_2$ | $Br-[CH(C_6H_3Cl_2)-CH_2-CH(C_6H_5)-CN]_n$ | $(C_6H_3Cl_2)CHBr-CH_2-CH(C_6H_5)-CN$ |
| 12 | $HOOC-(CH_2)_2-CHBr-CN$ | $(C_8H_{17})CH=CH_2$ | $Br-[CH(C_8H_{17})-CH_2-CH(CN)-(CH_2)_2-COOH]_n$ | $(C_8H_{17})CHBr-CH_2-CH(CN)-(CH_2)_2-COOH$ |
| 13 | $C_2H_5-CCl_2-CN$ | $(C_4H_9)CH=CH_2$ | $Cl-[CH(C_4H_9)-CH_2-CCl(C_2H_5)-CN]_n$ | $C_4H_9-CHCl-CH_2-CCl(C_2H_5)=CN$ |
| 14 | $CH_3-CCl_2-CN$ | $ClCH_2-CH=CH_2$ | $Cl-[CH(CH_2Cl)-CH_2-CCl(CH_3)-CN]_n$ | $ClCH_2-CHCl-CH_2-CCl(CH_3)-CN$ |
| 15 | $C_2H_5O-CCl_2-CN$ | $C_2H_5O-CH_2-CH=CH_2$ | $Cl-[CH(CH_2-OC_2H_5)-CH_2-CCl(OC_2H_5)CN]_n$ | $C_2H_5O-CH_2-CHCl-CH_2-CCl(OC_2H_5)CN$ |
| 16 | $C_6H_5-CCl_2-CN$ | $HO-CH_2-CH=CH_2$ | $Cl-[CH(CH_2OH)-CH_2-CCl(C_6H_5)-CN]_n$ | $HO-CH_2-CHCl-CH_2-CCl(C_6H_5)-CN$ |
| 17 | $C_6H_5-CCl_2-CN$ | $NC-CH_2-CH=CH-CH_2-CN$ | $Cl-[CH(CH_2-CN)-CH(CH_2CN)-CClCN-C_6H_5]_n$ | $NC-CH_2-CHCl-CH_2-CH(CH_2-CN)-CCl-CN-C_6H_5$ |
| 18 | $(CH_3)_2CCl-CN$ | $CH_3-CO-O-CH_2-CH=CH_2$ | $Cl-[CH(CH_2-O-CO-CH_3)-CH_2-C(CH_3)_2-CN]_n$ | $CH_3-CO-O-CH_2-CHCl-CH_2-C(CH_3)_2-CN$ |
| 19 | $ClCH_2-CN$ | $CH_3-CH-OCO-C_6H_5$ | $H-[CH(CH_3-O-CO-C_6H_5)-CH_2-CHClCN]_n$ | $C_6H_5-CO-O-CH_2-CH_2-CH_2-CHCl-CN$ |
| 20 | $(C_6H_{13})CHBr-CN$ | $CH_3=CH-CO-OCH_3$ | $Br-[CH(CO-OCH_3)-CH_2-CH(C_6H_{13})CN]_n$ | $CH_3O-CO-CHBr-CH_2-CH(C_6H_{13})-CN$ |

(9)

$$Cl_3C-CN + nR'HC=CH_2 \longrightarrow$$

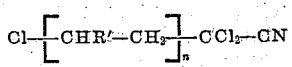

R' being hydrogen, alkyl, aryl, carboxyl, carboxyalkyl, and groups hydrolyzable thereto or acyloxymethyl In Table I are summarized a number of the specific reactions which can be carried out by the method of the invention.

Of the compounds obtainable by the invention those of the type formula

in which $n=1$, i. e., those of the formula

are especially preferred since they are obtained in significant and, in many cases, major proportions from the reaction of the invention, particularly in cases where X is bromine. Such products are useful in the preparation of pharmaceuticals, and can likewise serve as synthetic intermediates in that they can undergo a wide variety of reactions including hydrolysis, reduction and dehydrohalogenation.

In practice, the method of the invention consists in heating at 25–130° C. an olefinic compound, R'R''C=CHR''', or mixtures thereof, with from 1 to 20 molar equivalents of a 2-halogenoalkanenitrile, $XR_2C-CN$, in the presence of a source of free radicals such as ultra-violet light or from 0.1 to 15.0% by weight of a compound or mixture thereof which decomposes under these reaction conditions to yield free radicals, e. g., peroxidic comopunds, including organic peroxides such as benzyl peroxide, acetyl peroxide and ter.-butyl hydroperoxide. The reaction will vary somewhat depending upon the temperature and reactants employed, but as little as 5 hours may suffice to achieve an appreciable yield of the desired product, and times in excess of 60 hours are seldom necessary. Reactions involving volatile and/or gaseous olefinic reactants, e. g., ethylene, can be conducted in pressurized reaction vessels, pressures in the range of 15–1000 p. s. i. being ordinarily sufficient. In cases where a polymerizable olefinic compound, e. g., styrene, methyl, methacrylate, or vinyl acetate, is employed in the reaction, it may be preferable to add the olefinic compound incrementally to the reaction mixture in order to secure the optimum yield of the reaction product of the type $X-CR'R''-CHR'''-CR_2-CN$. The reaction products can be isolated and purified by extraction, fractional distillation and/or crystallization.

The following examples disclose the invention in more detail. All parts are by weight.

*Example 1*

A mixture of 76 parts of trichloroacetonitrile, 26 parts of octene-1 and 2.2 parts of benzoyl peroxide is heated at about 79° C. for 24 hours, after which 2.2 parts of benzoyl peroxide are added and heating is continued for an additional 24 hours. The reaction mixture is then evaporated to remove any unreacted starting materials, and the residue is dissolved in about 70 parts of diethyl ether. The latter solution is washed with dilute aqueous sodium bicarbonate, dried and evaporated to remove the ether. Fractional distillation of the residual oil yields 39 parts of a new trichlorodecanenitrile, considered to be 2,2,4-trichlorodecanenitrile, B. 80–98° C./0.15–0.5 mm.; $n_D^{20}$ 1.4715; per cent chlorine, 41.36 (theory 41.40); per cent nitrogen (Kjeldahl), 5.09 (theory 5.46).

*Example 2*

One hundred and twelve parts of octene-1 are added to 476 parts of 2,2,3-trichloropropionitrile together with 10 parts of benzoyl peroxide, and the mixture is heated for 20 hours at 79–80° C. after which 10 additional parts of benzoyl peroxide are added and heating is then continued for an additional 28 hours. The reaction product is isolated and purified, as in Example 1, to yield 201.4 parts of new trichloroundecanenitrile, considered to be 2,4-dichloro-2-chloromethyl-decanenitrile, B. 116–124° C./0.3–0.4 mm.; per cent chlorine, 39.1 (theory, 39.3); per cent nitrogen (Kjeldahl), 4.46 (theory, 5.2). Some higher-boiling reaction product is also formed.

*Example 3*

A mixture of 100 parts of bromoacetonitrile, 47 parts of octene-1 and 4 parts of benzoyl peroxide is heated at 79° C. for 20 hours, after which 4 parts of benzoyl peroxide are added and heating is continued for an additional 28 hours. The reaction product is isolated and purified as in previous examples to yield 73.5 parts of a new monobromodecanenitrile, considered to be 4-bromodecanenitrile, B. 96–98° C./0.2 mm.; $n_D^{20}$ 1.4722; per cent bromine, 34.55 (theory, 34.4); per cent nitrogen, 6.02 (theory, 6.03). The higher-boiling residue from the above distillation is believed to contain some 6-bromo-4-hexyldodecanenitrile.

*Example 4*

A mixture of 304 parts of trichloroacetonitrile and 7 parts of benzoyl peroxide is enclosed in an evacuated pressure vessel to which ethylene is admitted until a pressure of about 600 p. s. i. is obtained at approximately 75° C. The reaction is carried out for 24 hours at this temperature, the pressure being maintained by incremental additions of ethylene. At the end of the reaction, the vessel is cooled, opened and the contents are fractionally distilled to yield 11.3 parts of 2,2,4-trichlorobutyronitrile, B. 94–97° C./48 mm.; $n_D^{20}$ 1.4778; per cent chlorine, 62.6 (theory), 61.8; per cent nitrogen (Kjeldahl), 7.18 (theory, 8.1); as well as 21 parts of a new trichlorohexanenitrile, considered to be 2,2,6-trichlorohexanenitrile, B. 98–99° C./5.5 mm.; $n_D^{20}$ 1.4784; per cent chlorine, 52.4 (theory, 53.1); per cent nitrogen (Kjeldahl), 7.53 (theory, 7.0). The higher-boiling residue is believed to contain some 2,2,8-trichlorooctanenitrile.

*Example 5*

Ninety-five parts of dibromoacetonitrile are mixed with 16 parts of allyl acetate and 1.5 parts of benzoyl peroxide and heated for 44 hours, an additional 1.5 parts of the peroxide being introduced into the reaction mixture after 24 hours of reaction time. The reaction mixture is then fractionally distilled to yield 25 parts of a new acetoxydibromopentanenitrile, considered to be 5 - acetoxy - 2,4-dibromopentanenitrile, B. 110–115° C./0.1–0.3 mm.; $n_D^{20}$ 1.5123; per cent bromine, 52.1 (theory, 53.4).

*Example 6*

To 317 parts of 2,2,3-trichloropropionitrile, at about 75–80° C., are added 60 parts of allyl acetate in 3 equal increments at 0, 20, and 44 hours of reaction time, 5.7 parts of benzoyl peroxide being added in 3 equal increments at the same times. The total reaction time is 68 hours. After the usual isolation and purification, a new acetoxytrichlorohexanenitrile is obtained. This is considered to be 5-acetoxy-2,4-dichloro-2-chloromethylpentanenitrile, B. 131–134° C./2.2 mm.; $n_D^{20}$ 1.4960; per cent chlorine, 40.72 (theory, 41.14).

Having thus described my invention, what I claim and desire to protect by Letters Patent is:

1. A method which comprises subjecting an olefinic compound of the formula $CH_2=CHR''$, R'' being selected from the class consisting of hydrogen and acetoxymethyl, and a 2-halogenoalkanenitrile of the formula

to the action of a free radical type polymerization initiator, X being selected from the class consisting of chlorine and bromine; R and R' being selected from the class consisting of chlorine and chloromethyl where X is chlorine and R and R' being selected from the class consisting of bromine, and hydrogen, where X is bromine; and recovering a product of the formula $$X-[CH_2-CHR'']_nCRR'CN$$

where $n$ is an integer from 1 to 3.

2. A method which comprises subjecting ethylene and trichloroacetonitrile to the action of a peroxygen compound catalyst.

ELBERT C. LADD.

REFERENCES CITED

The following references are of record in the file of this patent:

UNITED STATES PATENTS

| Number | Name | Date |
|---|---|---|
| 2,440,800 | Hanford et al. | May 4, 1948 |
| 2,440,801 | Hanford et al. | May 4, 1948 |